United States Patent
Hergenröder et al.

(10) Patent No.: US 11,756,189 B2
(45) Date of Patent: Sep. 12, 2023

(54) METHOD AND SYSTEMS FOR PROVIDING SYNTHETIC LABELED TRAINING DATASETS AND APPLICATIONS THEREOF

(71) Applicant: Siemens Aktiengesellschaft, Munich (DE)

(72) Inventors: Simon Hergenröder, Erlangen (DE); Maximilian Metzner, Bavaria (DE); Sören Weissert, Aalen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/927,839

(22) PCT Filed: May 14, 2021

(86) PCT No.: PCT/EP2021/062809
§ 371 (c)(1),
(2) Date: Nov. 25, 2022

(87) PCT Pub. No.: WO2021/239476
PCT Pub. Date: Dec. 2, 2021

(65) Prior Publication Data
US 2023/0196734 A1   Jun. 22, 2023

(30) Foreign Application Priority Data
May 27, 2020   (EP) .................................... 20176860

(51) Int. Cl.
*G06K 9/00* (2022.01)
*G06V 10/774* (2022.01)
(Continued)

(52) U.S. Cl.
CPC ............ *G06V 10/774* (2022.01); *G06T 7/001* (2013.01); *G06T 7/74* (2017.01); *G06V 10/82* (2022.01);
(Continued)

(58) Field of Classification Search
CPC ...... G06V 10/774; G06V 10/82; G06V 20/70; G06T 7/001; G06T 7/74;
(Continued)

(56) References Cited

U.S. PATENT DOCUMENTS

2013/0279790 A1* 10/2013 Kaizerman ............. G06T 7/001
    382/144
2017/0153627 A1* 6/2017 Jäger et al. ............. G06N 5/022
(Continued)

FOREIGN PATENT DOCUMENTS

EP      3 495 771 A1    6/2019
WO   WO 2019-020791 A1   1/2019

OTHER PUBLICATIONS

PCT International Search Report and Written Opinion of International Searching Authority dated Aug. 23, 2021, corresponding to PCT International Application No. PCT/EP2021/062809 filed May 14, 2021.

*Primary Examiner* — Samir A Ahmed
(74) *Attorney, Agent, or Firm* — Henry M. Feiereisen LLC

(57) ABSTRACT

A computer-implemented method and system provides a labelled training dataset. At least one sub-object or component is selected in a CAD model of an object comprising a plurality of sub-objects or components. A plurality of different render images is generated and the different render images contain the at least one selected sub-object or component. The different render images are labelled on the basis of the CAD model to provide a training dataset based on the labelled render images. Also, a computer-implemented method provides a trained function that is trained on the training dataset. A computer-implemented image recognition method uses such the trained function. An image recognition system comprising an image capture device and a data processing system carries out the image recognition (Continued)

method. A computer program comprises instructions that cause the system to carry out the methods.

15 Claims, 13 Drawing Sheets

(51) Int. Cl.
    *G06V 10/82*     (2022.01)
    *G06V 20/70*     (2022.01)
    *G06T 7/73*     (2017.01)
    *G06T 7/00*     (2017.01)

(52) U.S. Cl.
    CPC .... *G06V 20/70* (2022.01); *G06T 2207/20081* (2013.01); *G06T 2207/20084* (2013.01); *G06T 2207/30141* (2013.01)

(58) Field of Classification Search
    CPC . G06T 2207/20081; G06T 2207/20084; G06T 2207/30141
    See application file for complete search history.

(56) References Cited

U.S. PATENT DOCUMENTS

| | | |
|---|---|---|
| 2019/0042940 A1 | 2/2019 | Sakairi et al. |
| 2019/0178643 A1 | 6/2019 | Metzler et al. |
| 2020/0167510 A1 | 5/2020 | Buggenthin et al. |

\* cited by examiner

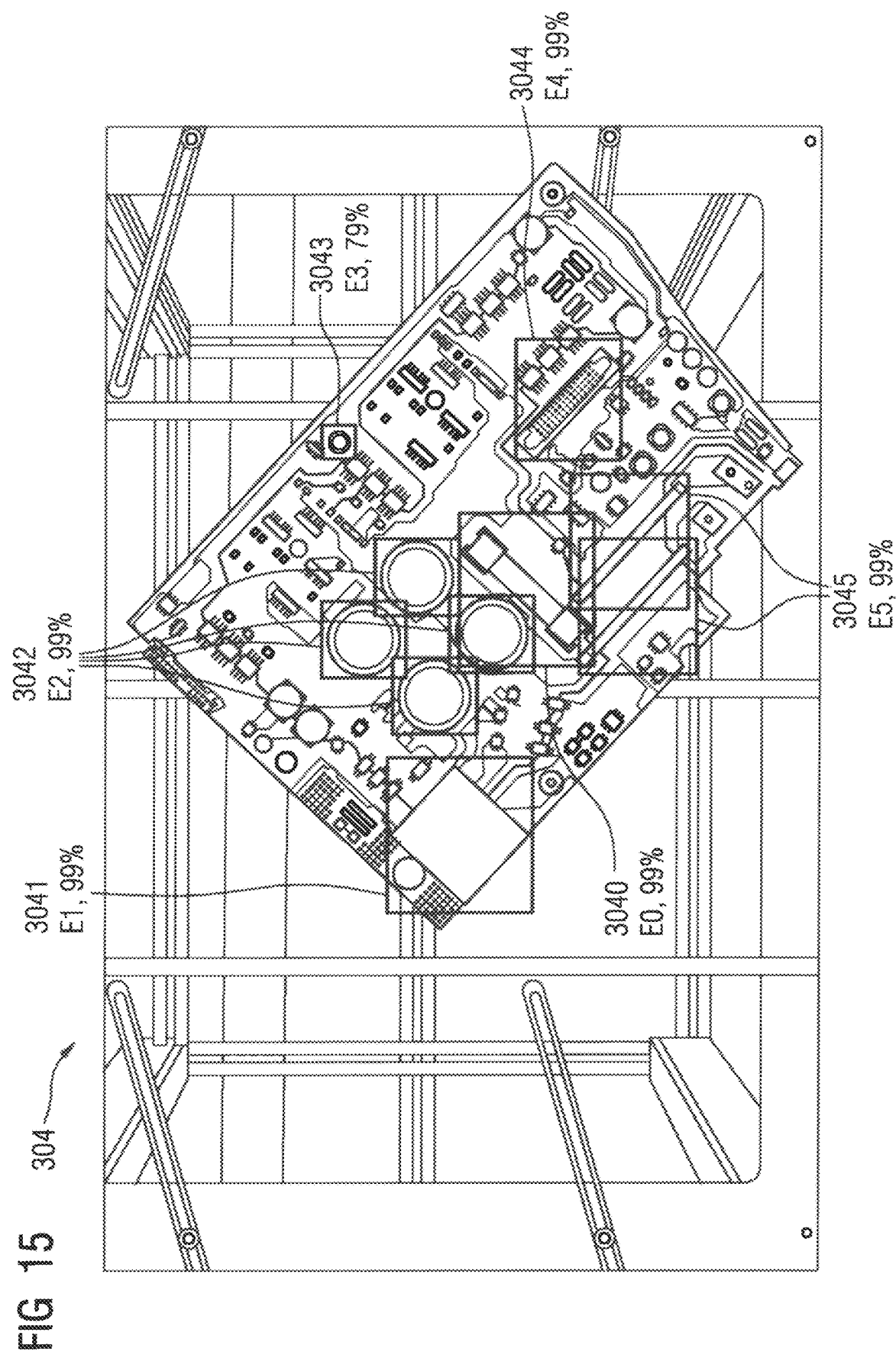

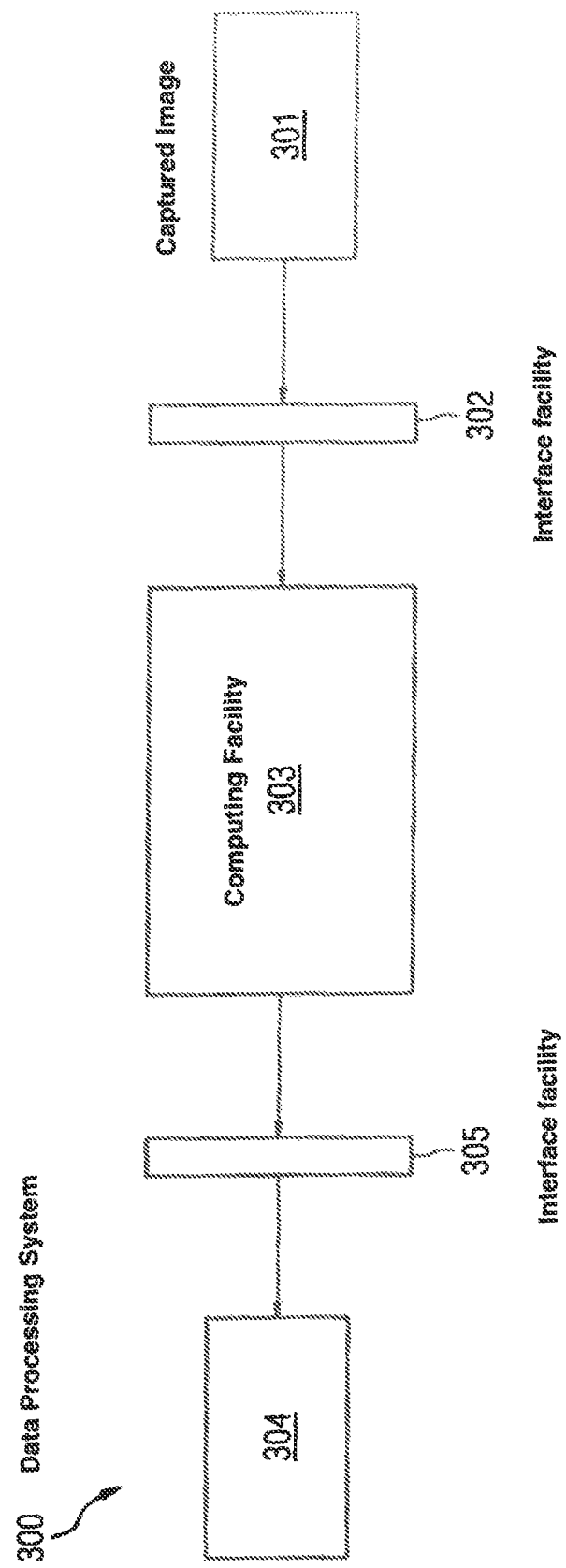

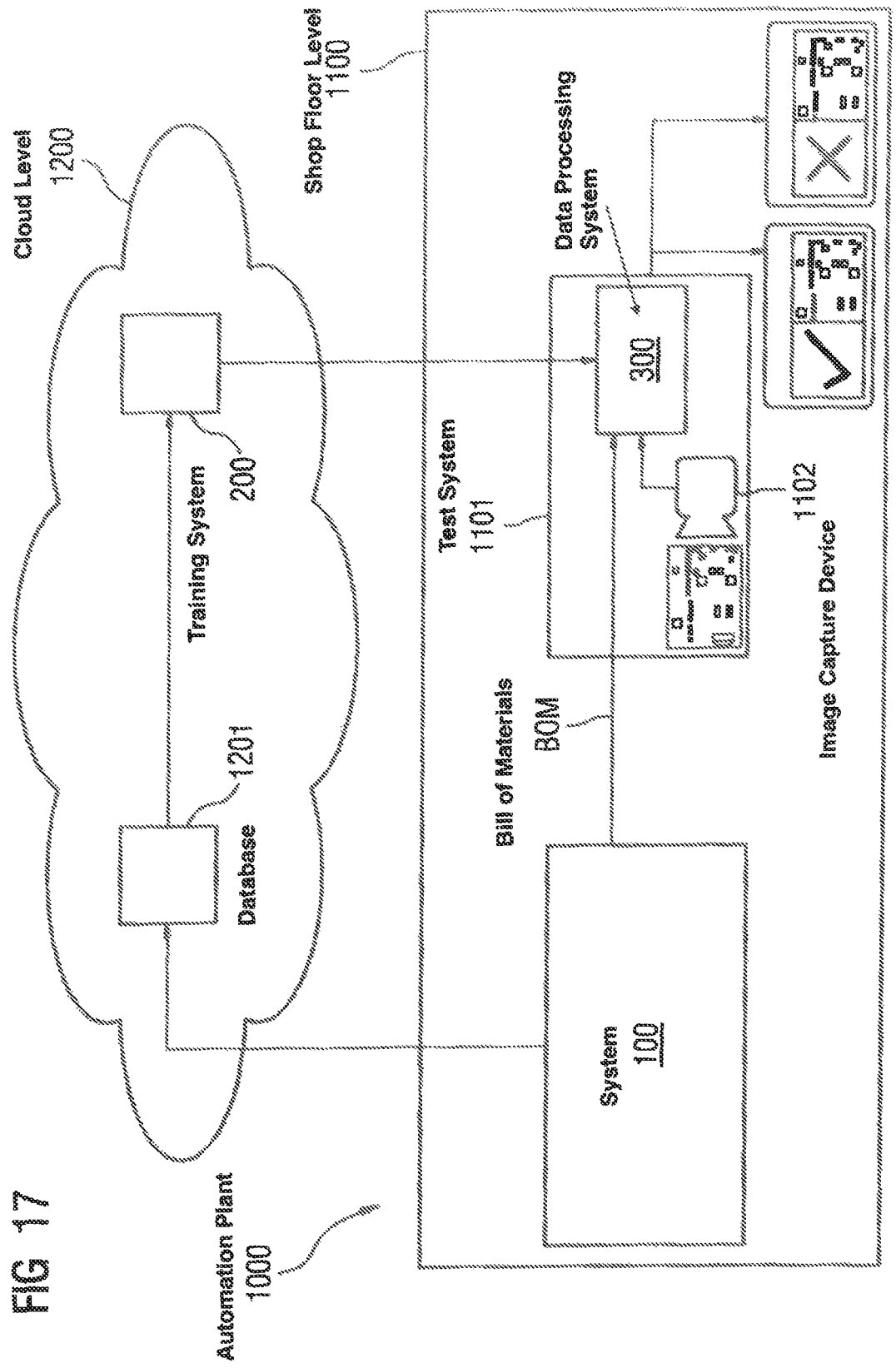

METHOD AND SYSTEMS FOR PROVIDING SYNTHETIC LABELED TRAINING DATASETS AND APPLICATIONS THEREOF

CROSS-REFERENCES TO RELATED APPLICATIONS

This application is the U.S. National Stage of International Application No. PCT/EP2021/062809, filed May 14, 2021, which designated the United States and has been published as International Publication No. WO 2021/239476 A1 and which claims the priority of European Patent Application, Serial No. 20176860.3, filed May 27, 2020, pursuant to 35 U.S.C. 119(a)-(d).

BACKGROUND OF THE INVENTION

The invention relates to a computer-implemented method for providing a labeled training dataset.

The invention also relates to a system for providing such a training dataset.

The invention further relates to a computer-implemented method for providing a trained function that is trained on the aforementioned training dataset, and to a computer-implemented image recognition method which uses such a trained function.

The invention additionally relates to an image recognition system comprising an image capture device and a data processing system designed and configured to carry out the aforementioned image recognition method.

The invention further relates to a computer program comprising first instructions that cause the aforementioned system to carry out the method for providing a labeled training dataset,
and/or second instructions which, when the program is executed by a computer, cause the computer to carry out the aforementioned computer-implemented method for providing a trained function,
and/or third instructions causing said image recognition system to carry out said image recognition method.

Creating labeled datasets is a well-known problem. In order to train functions or AI algorithms, for example neural networks for image or object recognition applications, large, labeled datasets are often necessary.

Particularly in the industrial environment, a balanced database is difficult to generate (equal ratio of good and bad data). Intentional generation of errors is further time consuming. In addition, unforeseen environmental influences can only be mapped in the dataset to a limited extent.

A possible approach for generating the labeled datasets is to perform the labeling manually. Manual labeling (for example in the case of Google) is enormously time-intensive and costly. Manual, human labeling is also prone to error due to lack of concentration and the monotony of the task. Labeling in the technical field requires expert knowledge of components and processes and is accordingly even more expensive.

The object of the present invention may therefore be seen as providing methods and systems which enable labeled datasets of any size to be created with low investment of time and money.

SUMMARY OF THE INVENTION

This object is inventively achieved using a computer-implemented method for providing a labeled training dataset as mentioned in the introduction by selecting at least one sub-object in a CAD model of an object comprising a plurality of sub-objects, wherein the CAD model contains a description of the at least one sub-object and a coordinate of the at least one sub-object (in the image of the object), generating a plurality of different render images, wherein the (synthetic) different render images, preferably each render image, include the at least one selected sub-object, labeling the different render images based on the description of the at least one sub-object contained in the CAD model and on the coordinate of the at least one sub-object contained in the CAD model in order to provide a training dataset based on the labeled render images.

Using the method according to the invention eliminates the time and effort of manual labeling and provides error-free and fast creation of large, labeled datasets.

The labeling based on the CAD model is preferably performed automatically.

The CAD model of the (entire) object thus contains the information about the coordinates of the individual sub-objects and preferably also their relationships (of the sub-objects) to one another. The coordinates of the individual sub-objects can be used to determine their position in the object as a whole.

The training dataset labeled as described above can be used, for example, to train a function for an image recognition method which can be used to check whether correct real sub-objects of a real (entire) object are at the correct positions.

In the context of the present invention, the term "render image" is taken to mean, for example, a virtual (realistic) three-dimensional representation of an object generated by means of precomputation on a computer.

The aforementioned CAD model can be two-dimensional or three-dimensional (2D or 3D). A (use case-related) scene or environment can serve as an object comprising a plurality of sub-objects. The term "use case-related environment" is understood here as meaning the scene/environment that contains the sub-objects relevant to the selected use case. For example, in industrial plant construction (example of a use case), the object can be the entire industrial plant, wherein the sub-objects can be areas of the industrial plant. In automotive production, for example, the object can be a vehicle body, wherein the sub-objects can be vehicle body parts. In the field of autonomous driving, for example of trains, the object can be, for example, an environment typically visible from a driver's cab or in the driver's field of view, wherein the sub-objects can be a dashboard/instrument panel, signal systems ahead, for example H/V (main/distant) signal systems, etc.

Depending on the level of detail of the CAD model, the sub-objects may comprise further sub-sub-objects.

It is also conceivable for two, three, four, five, six or all the sub-objects to be selected so that the selected sub-objects constitute, for example, the entire scene represented by the object. This enables (labeled) training datasets to be generated, which, as will be discussed below, can be used to train a function for classifying images as a whole. The classification can be a good/bad assessment of the complete image.

For example, the labeling of the rendered images can be performed based on data available from the CAD model (for example material number, material, associated process steps, etc.).

In one embodiment, it can be provided that the render images are stored, for example, in a database, for example in a cloud database or in a cloud data lake.

It can advantageously be provided that a label of the at least one (selected) sub-object on the render image comprises a description of the at least one sub-object and a coordinate of the at least one sub-object (position X, Y of the sub-object in the image). The labels can be produced for example in the form of a list: object 1 at position (X1, Y1), object 2 at position (X2, X2), . . . , object N at position ($X_N$, $Y_N$).

The description of the sub-object can include, for example, information about the type of sub-object, its nature, function, etc.

The label can also be visualized in the form of a rectangular border, for example, preferably in a predefinable color. Visualization can enable the person involved to quickly check the results, for example.

Further advantages can emerge if the training dataset comprises a number of real images of the object, wherein the number is smaller compared to the number of render images and is for example approximately 0.1 to about 5%, in particular approximately 1%.

In addition, it can be provided that the sub-objects are structurally separated from one another.

It can also be provided that the sub-objects (ail or only part thereof) are of different design.

In one embodiment, the object can be envisaged as being an electronic assembly, in particular a printed circuit board assembly, wherein the sub-objects are preferably in the form of electronic components, in particular integrated or discrete components.

The labeling of the different render images based on the CAD model can be performed using a bill of materials of the electronic assembly. Such a bill of materials (BOM) can be stored in the CAD model.

Advantageously, it can be provided that the render images of the at least one sub-object differ from one another in at least one criterion, wherein the at least one criterion is selected from the group comprising: size of the at least one sub-object (in the image), illumination of the at least one sub-object, perspective from which the at least one sub-object can be seen in the render image, background of the at least one sub-object, position of the at least one sub-object, surface, texture, color.

It can also be provided that a number of sub-objects are selected in the CAD model, wherein the selected sub-objects can be assigned to a process sequence.

The assignment to the real processes can be carried out, for example, on the basis of manufacturing information or other information from PLM systems.

The object stated in the introduction is also inventively achieved by a system stated in the introduction for providing a labeled training dataset in that the system comprises:
 a computer-readable memory containing a CAD model of an object comprising a plurality of sub-objects,
 a first interface designed and configured to enable at least one sub-object to be selected in the CAD model, and
 a computing unit configured to generate a plurality of different render images, wherein the different render images contain the at least one selected sub-object, and to label the different render images based on the CAD model,
 a second interface designed and configured to provide a training dataset based on the different labeled render images.

The object stated in the introduction is also achieved by a computer-implemented method for providing a trained function, wherein at least one labeled training dataset that can be obtained as described above is provided,
 based on the at least one labeled training dataset, a function is trained to produce a trained function,
 the trained function is provided.

The function can usefully be a classification function and/or an object localization function, in particular based on a convolutional neural network.

In addition, a training system is also disclosed, wherein the training system comprises a first training interface facility configured to obtain at least one labeled training dataset that can be obtained according to the aforementioned method, a training computing unit configured to train a function based on the labeled training dataset, and a second training interface facility configured to provide the trained function.

With regard to simplification in the area of image recognition, the object stated in the introduction is achieved by a computer-implemented image recognition method, wherein
 input data is provided, wherein the input data is a captured image of a real object, wherein the real object comprises a plurality of real sub-objects,
 a trained function is applied to the input data to generate output data, wherein the trained function is provided according to the aforementioned method, wherein the output data comprises a classification and/or localization of at least one real sub-object in the input data,
 the output data is provided.

In other words, the output data comprises a segmentation of the real object into the sub-objects.

It can advantageously be provided that the steps of the method are repeated for a plurality of different captured images.

It may be useful for a description to be assigned to the at least one real sub-object.

It can be provided that the output data is made available in the form of a processed captured image, wherein the processed captured image is the captured image with at least one marking of the at least one real sub-object.

It can be provided that the marking comprises a legend for the at least one real sub-object and/or a coordinate of the at least one sub-object.

The legend of the real sub-object can include, for example, information about the type of the real sub-object, its nature, function, etc. The marking may also be visualized in the form of a rectangular border for example, preferably in a predefinabie color. Visualization can enable the person involved to quickly check the results, for example.

It may be useful for the legend to correspond to a bill of materials and include a confidence level for the recognition of the sub-object.

In one embodiment, it can be provided that the real object is in the form of an electronic assembly, in particular a printed circuit board assembly, and the sub-objects are in the form of electronic components, for example integrated or discrete components.

In one embodiment, the image recognition system is designed as a system for testing printed circuit boards, in particular a printed circuit board testing system.

Such a printed circuit board testing system can be very efficiently employed in the manufacture of printed circuit board assemblies, Usability of the knowledge available during product development (product structure, bill of materials (parts list)) allows automatic generation of useful training data, as this training data can be generated at individual part level and the trained function/trained algorithm can be trained to recognize these individual parts/these individual components.

In addition, the use of a CAD model allows the bill of material (BOM) to be assigned to a process sequence (BOP), The linkage provides an automated means of generating test programs for specific processes (based on customized training data). Again, knowledge of the hierarchical structure is used here.

BRIEF DESCRIPTION OF THE DRAWING

The invention will now be described and explained in more detail with reference to the exemplary embodiments illustrated in the accompanying figures in which:

FIG. 15 shows a captured image processed according to the image recognition method of FIG. 14, FIG. 16 shows a data processing system for carrying out an image recognition method, and FIG. 17 shows an automation system.

DETAILED DESCRIPTION OF PREFERRED EMBODIMENTS

Figure 1:
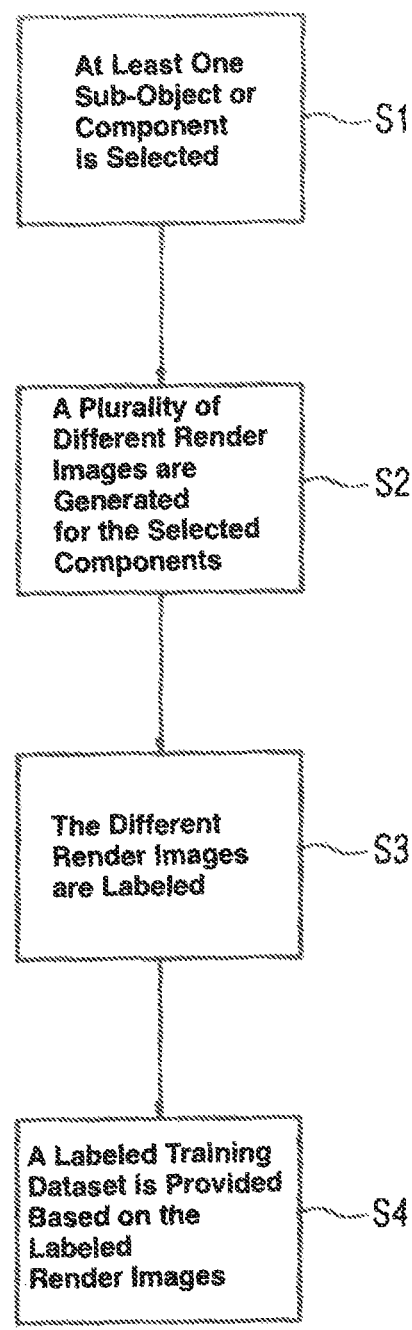
FIG. 1 shows a flowchart of a computer-Implemented method for providing a labeled training dataset.

In the exemplary embodiments and figures, identical elements or elements that have the same effect may be provided with the same reference characters. The elements shown and their size ratios with respect to one another are not always to be taken as true to scale, rather individual elements may be shown proportionately larger for better representability and/or for better understanding.

Reference will first be made to FIG. 1 to FIG. 10. FIG. 1 shows a flowchart of an embodiment of a computer-implemented method for providing a labeled training dataset.

Figure 2:
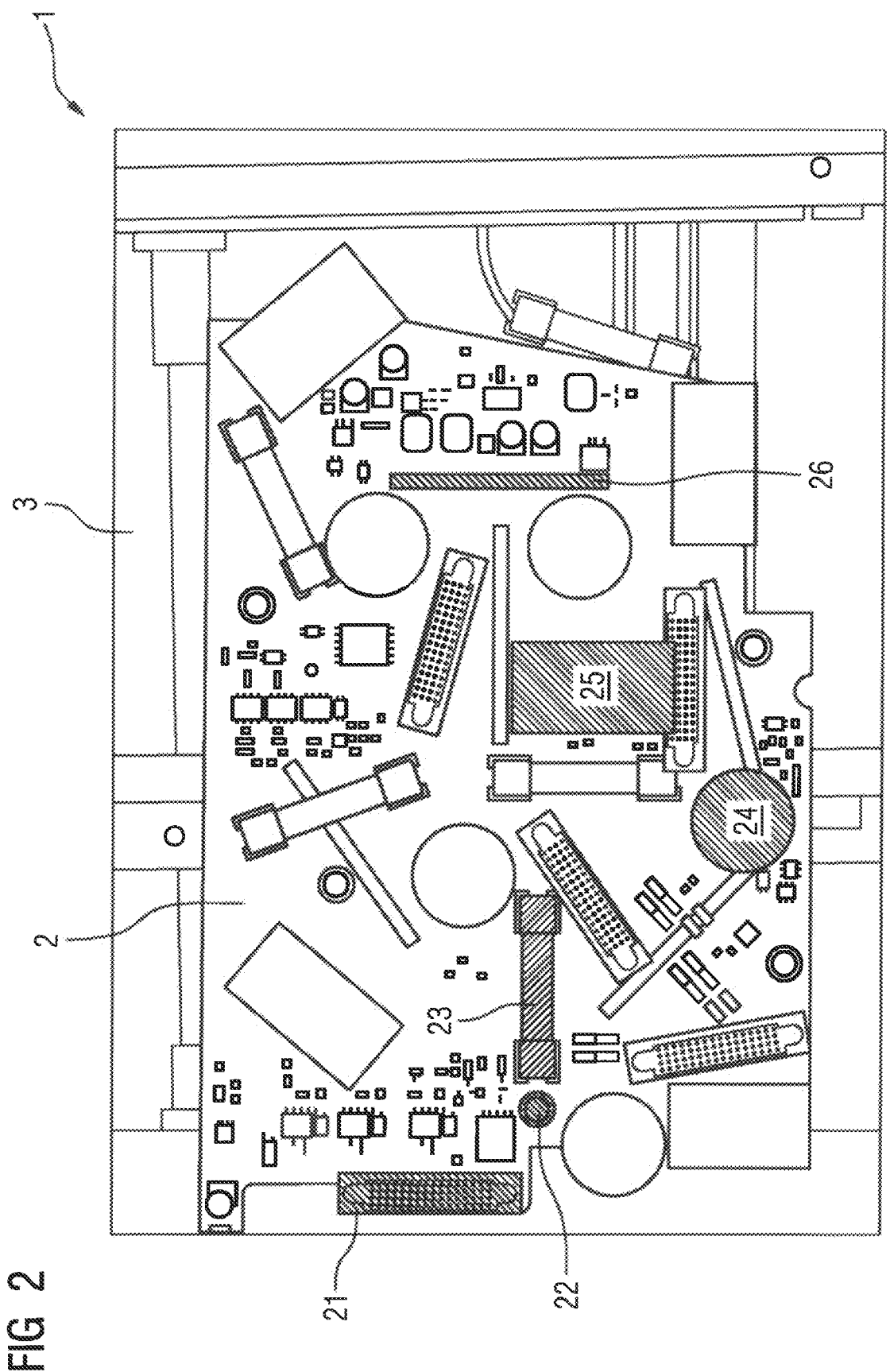
FIG. 2 shows a CAD model of a printed circuit board assembly.
Figure 3:
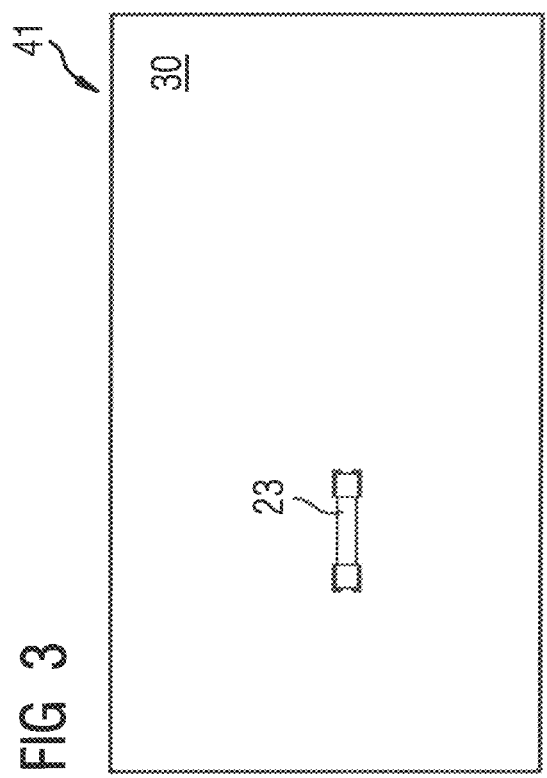
FIGS. 3 to 6 show intermediate images for generating labels.
Figure 4:
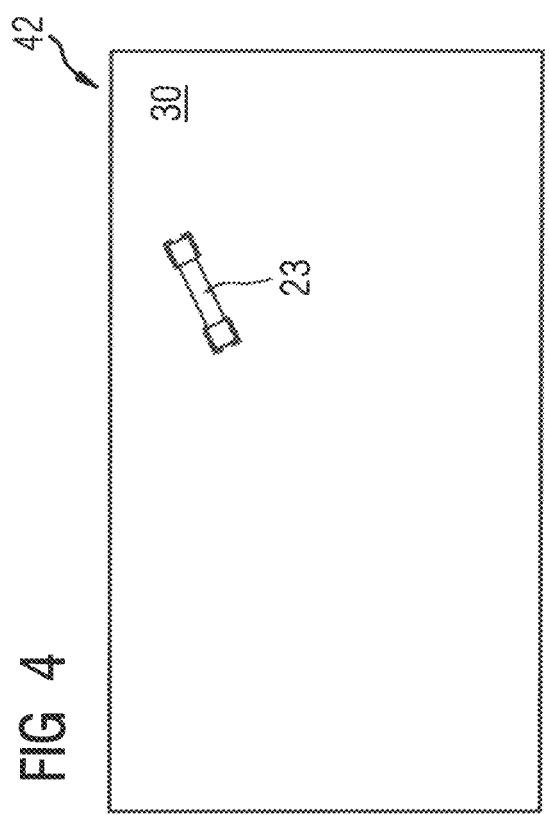
Figure 5:
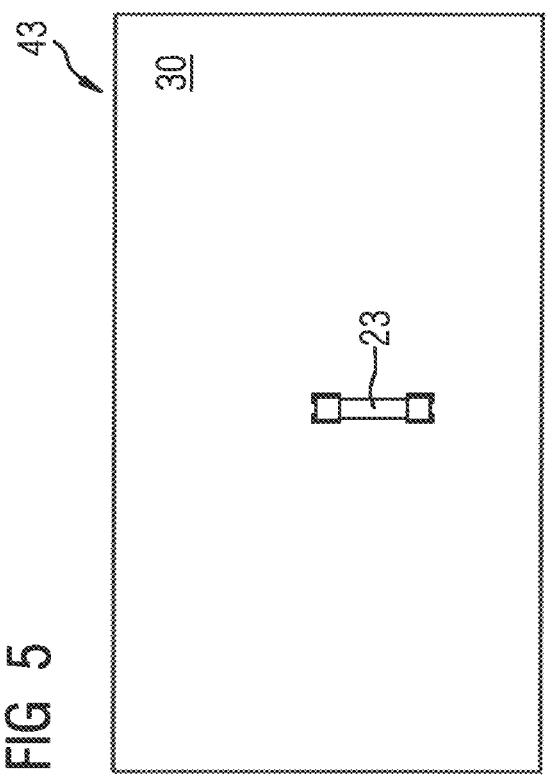
Figure 6:
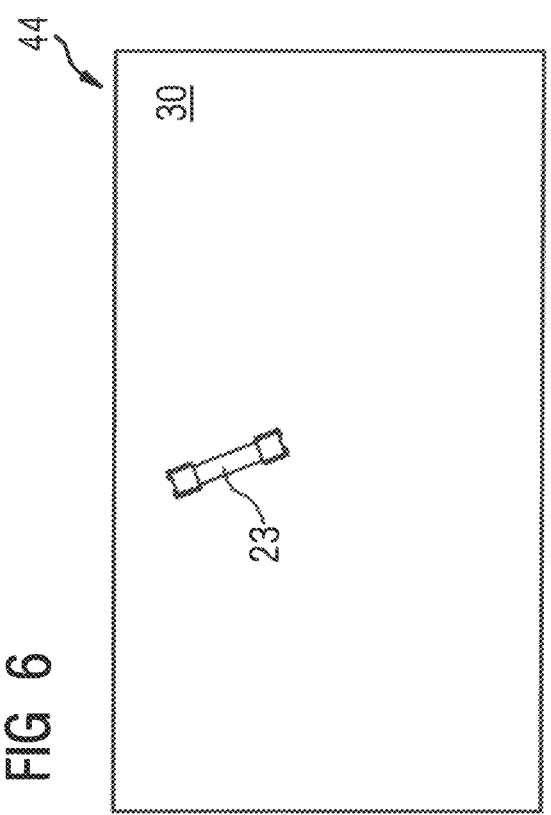
Figure 7:
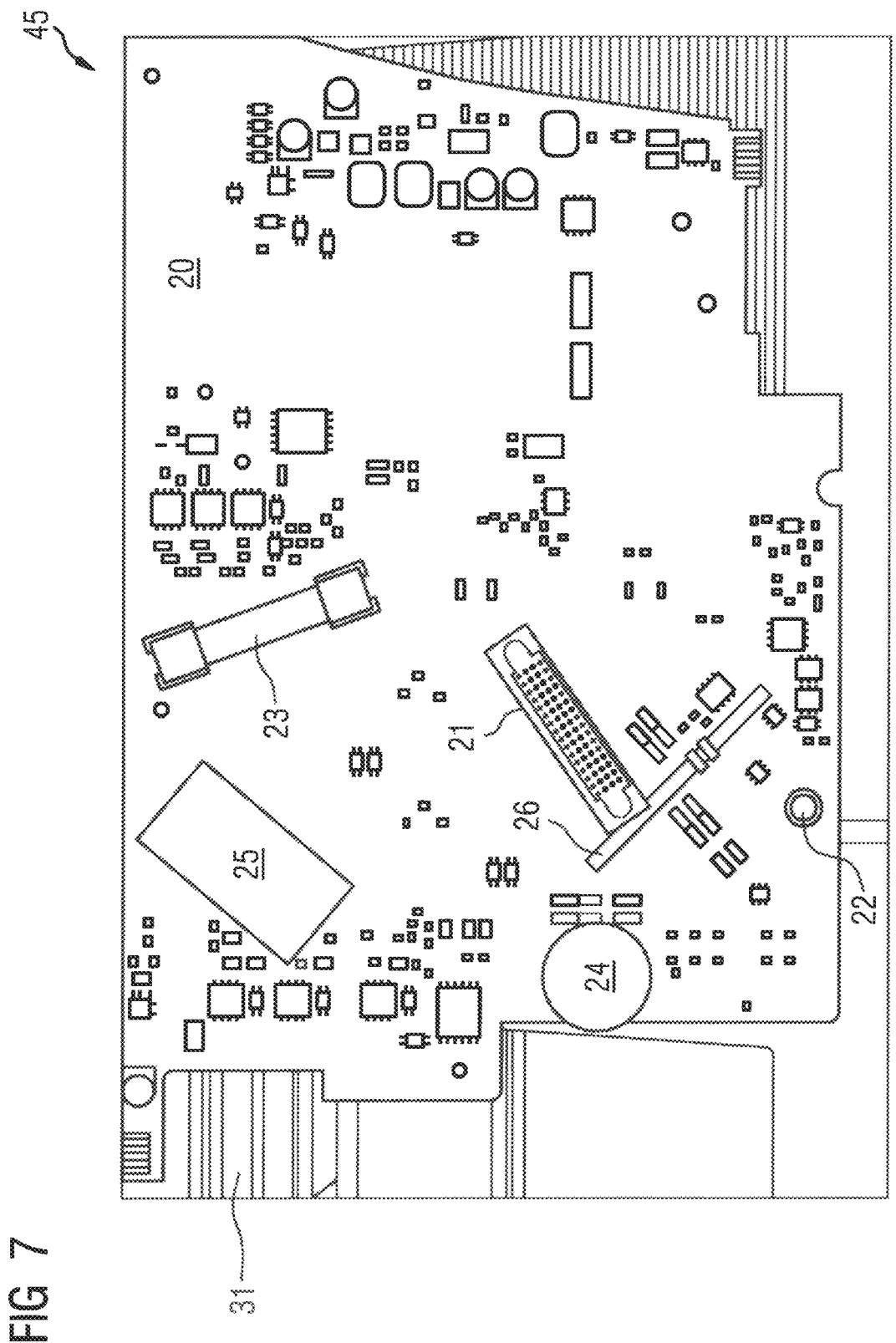
FIGS. 7 to 10 show generated render images.
Figure 8:
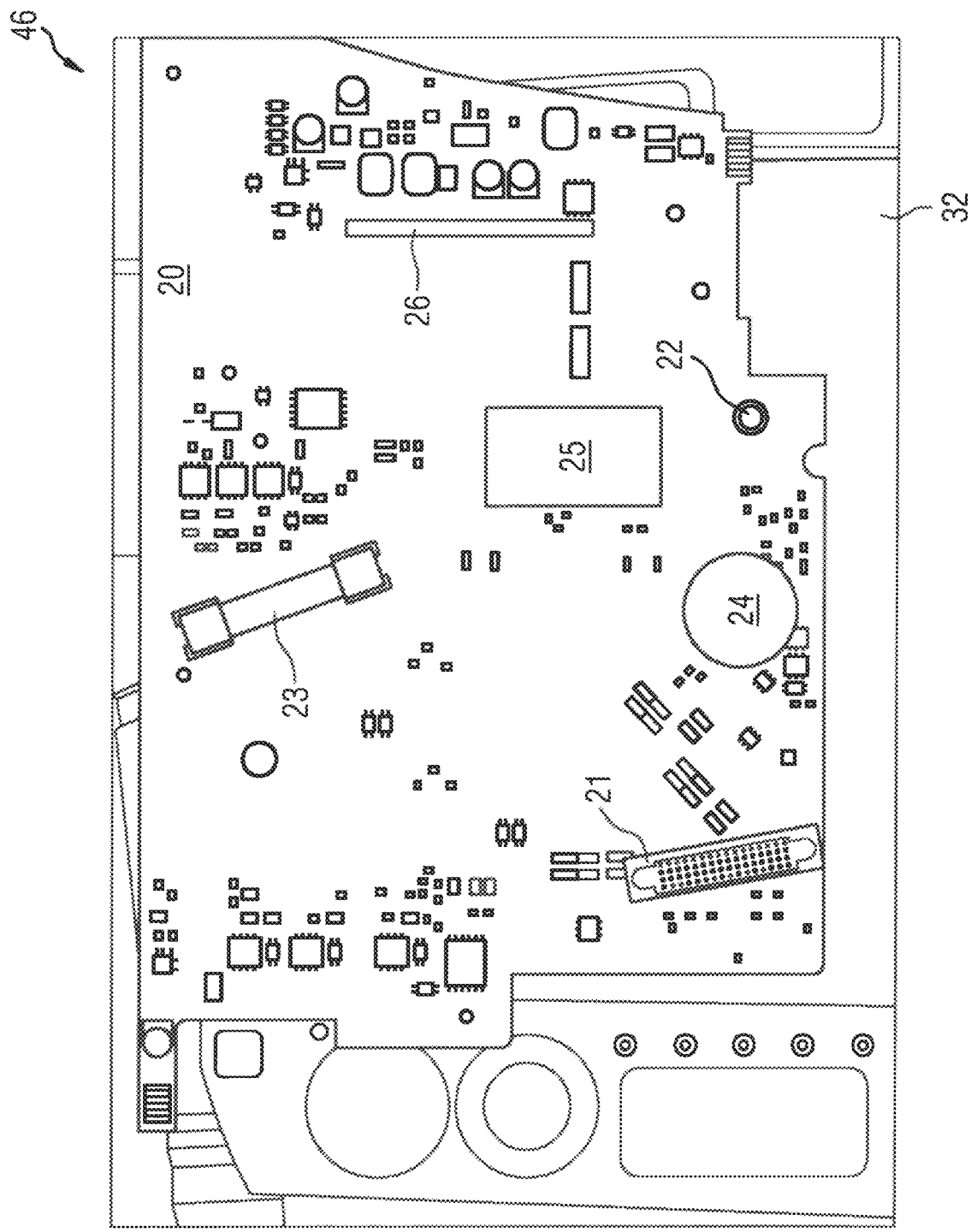
Figure 9:
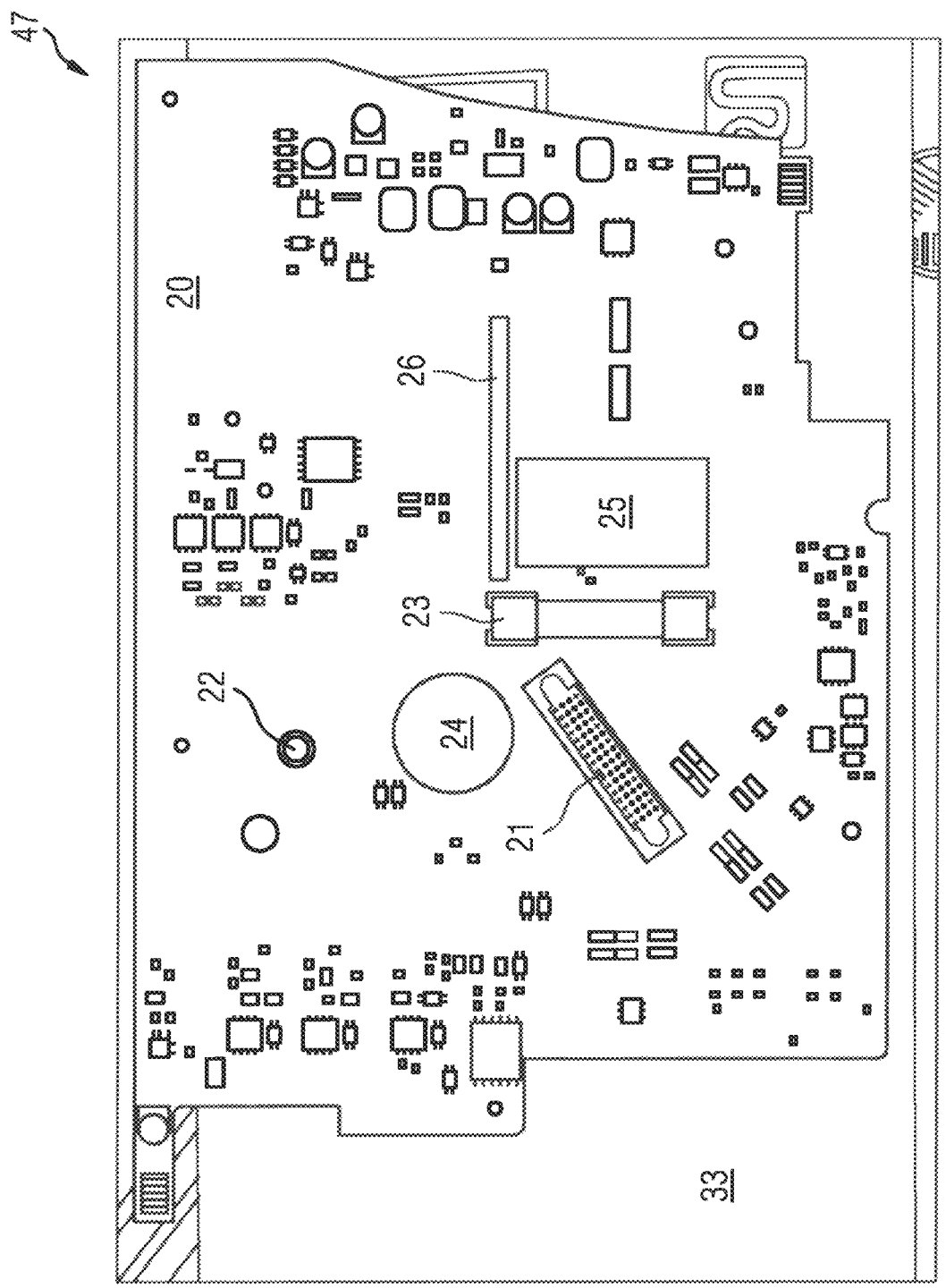

Based on a CAD model of an object, wherein the object comprises a large number of sub-objects, at least one sub-object is selected—step S1. FIG. 2 shows an example of a CAD model 1 of a printed circuit board assembly 2 on a background 3. The printed circuit board assembly 2 contains a plurality of electronic components. Six components 21, 22, 23, 24, 25, 26 of the printed circuit board assembly 2 are selected.

As shown, the components can be structurally separated from one another and of different design from one another. FIG. 2 indicates that there may also be identical components. Of the identical components, one component in each case can be selected for generating render images (see below).

The components 21, 22, 23, 24, 25, 26 in the CAD model 1 can be selected manually via a manually operable interface of a computer or also automatically, for example based on the BOM (bill of materials) and/or BOP (process sequence).

A plurality of different render images 45, 46, 47, 48 are generated for the selected components 21, 22, 23, 24, 25, 26—step S2. The render images are for example virtual, preferably realistic three-dimensional representations generated by means of precomputation on the computer, showing at least one of the selected components 21, 22, 23, 24, 25, 26. Preferably, at least one of the selected components 21, 22, 23, 24, 25, 26 is visible on each render image.

In a sub-step (not shown in FIG. 1), intermediate images 41, 42, 43, 44 can be generated (FIG. 3 to FIG. 6). These intermediate images 41, 42, 43, 44 can be used, for example, to generate the labels (rectangles with coordinates x, y).

On each intermediate image 41, 42, 43, 44, a respective component 23 can be seen in different positions and from different perspectives. The position of the component 23 on the intermediate image 41 to 44 can be random, for example generated using a random generator. However, the position of the component 23 on the intermediate image 41 to 44 can also correspond to the position assumed by one of the other components of identical design on the printed circuit board assembly 2 (cf. FIG. 2 with FIGS. 3 to 6). The intermediate images 41 to 44 have a white background 30.

FIGS. 7 to 10 show examples of different render images 45 to 48. On each render image, the selected components 21, 22, 23, 24, 25, 26 are shown.

On each render image 45 to 48 of FIGS. 7 to 10, a printed circuit board 20 of the printed circuit board assembly 2 is shown on a different background 31 to 34 in each case. The color of the printed circuit board may also be vaned (not shown here). In addition, each render image 45 to 48 shows all the selected components 21 to 26, which may be randomly distributed over the visible surface of the printed circuit board 20. The positions of the components 21 to 26 on the surface may also correspond to the positions occupied by the components of the same type (components of identical design) in the printed circuit board assembly 2 (cf. FIG. 2). Other components visible in the CAD model (cf. FIG. 2) are not visible in the render images 45 to 48. They may, but need not, be omitted when generating the render images. To achieve a random distribution as mentioned above, random positions on the surface of the printed circuit board 20 can be generated for the selected components 21 to 26.

Figure 10:
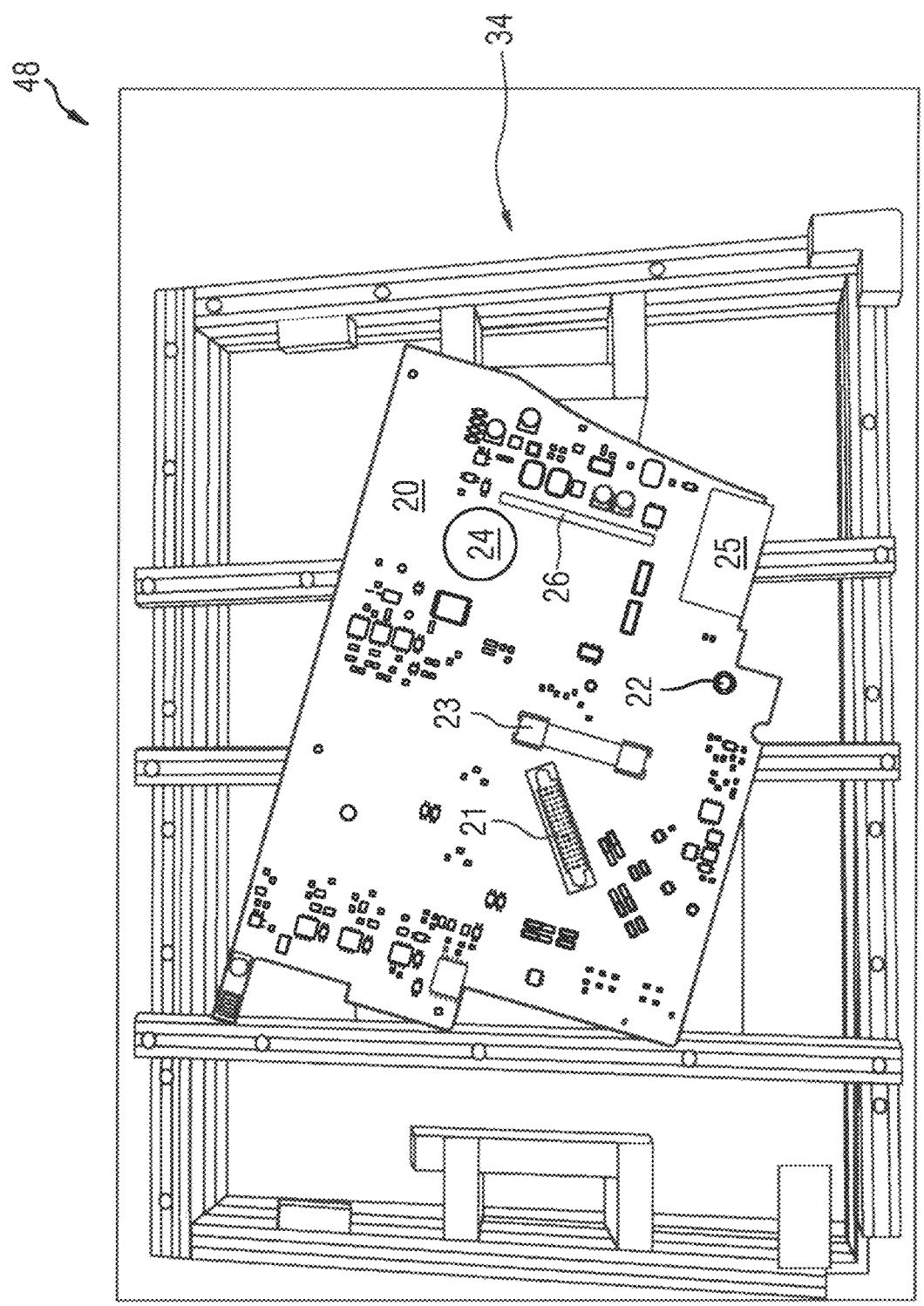

FIG. 10 also indicates that when the render images are generated, the size and/or position and/or orientation of the printed circuit board 20 can also be varied.

Based on the CAD model, the different render images 45 to 48 are labeled—step S3. The labeling can be based for example on corresponding entries in the CAD model. For example, the render images 45 to 48 can be labeled according to a bill of materials, Render images 45 to 48 can be labeled based on the label generation images/intermediate images 41, 42, 43, 44. For example, label of part 23 can be generated with intermediate image 43 or 44 and used for render image 47 or render images 45 and 46. Thus, labeling can be carried out automatically.

Render images 45 to 48 can be saved before or after labeling.

After the render images 45 to 48 have been labeled, a labeled training dataset is provided based thereon—step S4.

Figure 11:
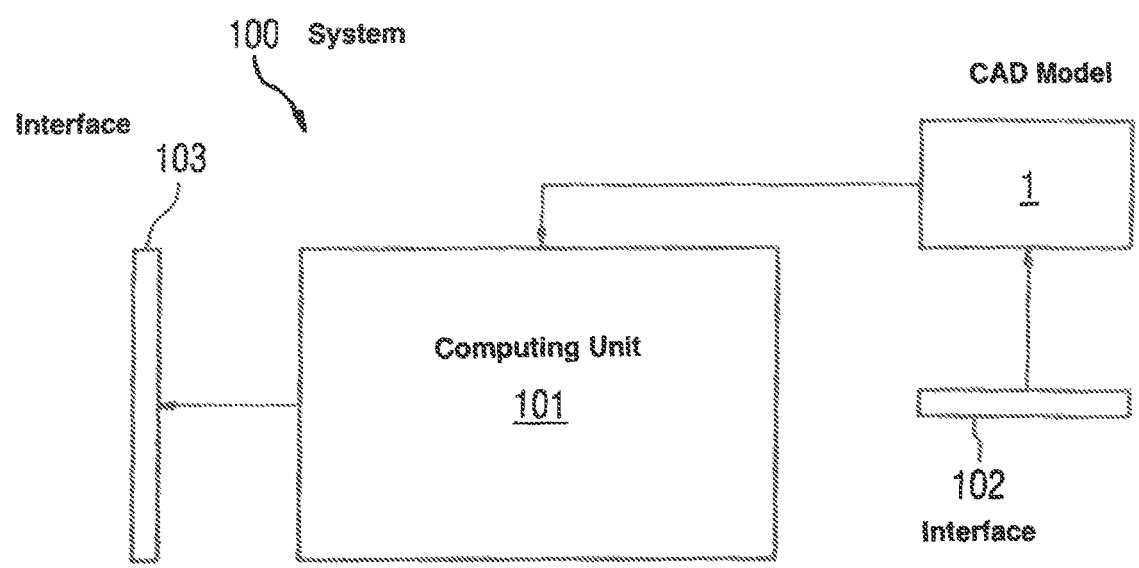
FIG. 11 shows a system for providing synthetic labeled training datasets.

The aforementioned procedure can be in the form of instructions of a computer program. The computer program can be run for example on a computing unit 101 (FIG. 11). It can be available/stored for example in a volatile or non-volatile memory of the computing unit.

AG 11 shows a system 100 that can, for example, provide the aforementioned (synthetic) labeled training dataset when the aforementioned computer program is run on the computing unit 101 incorporated in the system 100.

The system 100 can also comprise the CAD model 1 and a first interface 102 designed and configured to enable the components 21 to 26 to be selected in the CAD model 1.

The computing unit 101 is configured to generate the different render images 45 to 48 and label them based on the CAD model, for example based on the bill of materials that may be available in the CAD model.

The system 100 also has a second interface 103 designed and configured to provide the labeled training dataset based on the different render images 45 to 48.

Figure 12:
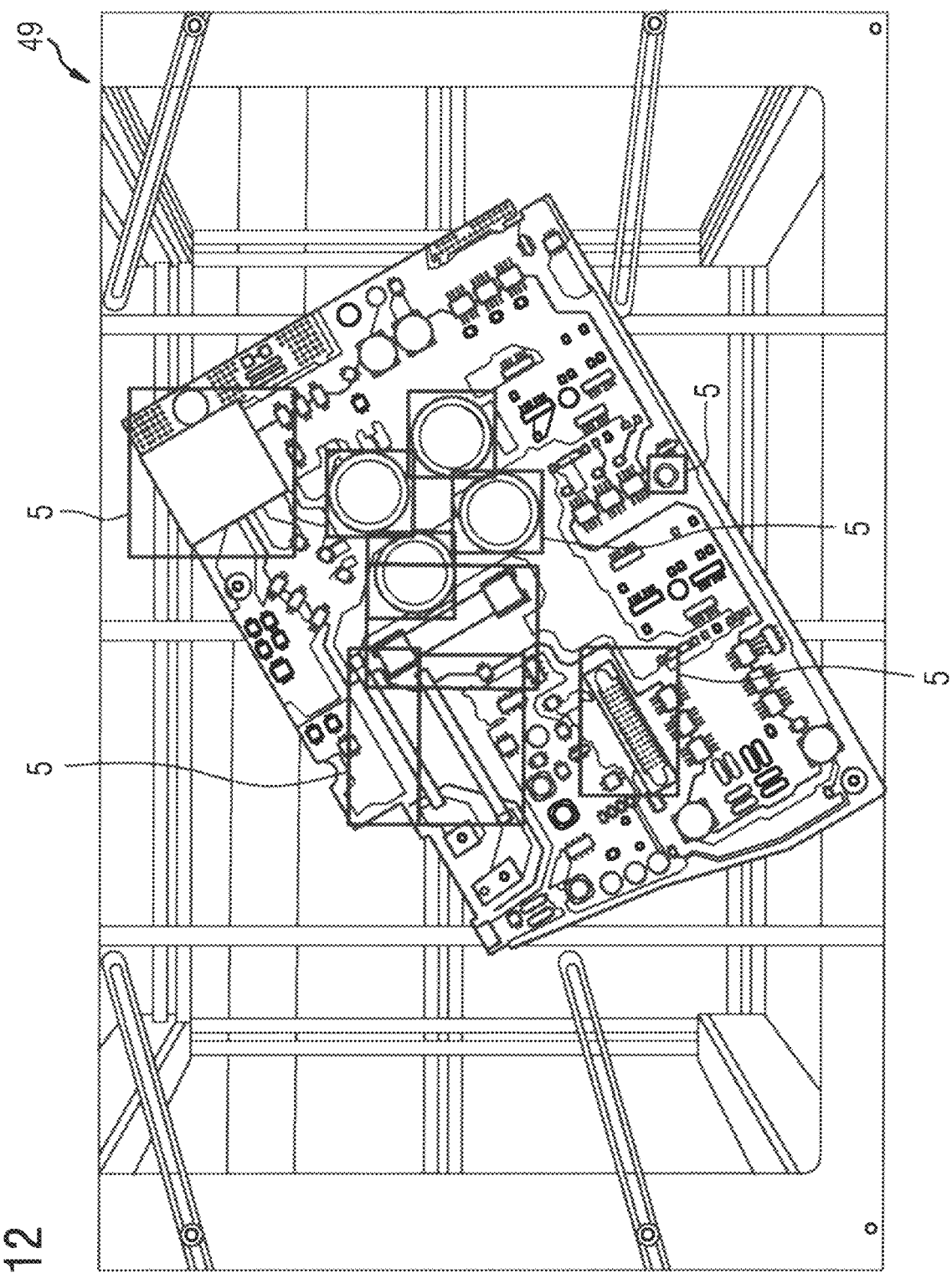
FIG. 12 shows a labeled render image.

FIG. 12 shows an example of a labeled render image 49, on which a total of ten sub-objects (components) of an object (printed circuit board assembly) have each been marked with a label 5, Each label 5 can comprise a description of the component and/or its coordinate on the labeled render image 49. In addition, each label 6 can be in the form of a rectangular border, for example in a predefinable color, which encloses the labeled component. Such a visualization allows for quick verification of the results for the person involved.

In summary, FIGS. 7 to 10 and FIG. 12 indicate that the labeled render images 45 to 49 differ from one another in at least one criterion, wherein the at least one criterion is selected from the group comprising: size of the components in the render image, illumination, perspective from which the components are seen, background of the components (the background of the components can include the printed circuit board 20), position of components in the respective render image 45 to 49, surface pattern, texture, color.

The selection of the components 21 to 26 can also be associated with a process sequence, for example a PCB assembly manufacturing process.

For example, CAD programs allow the bill of materials (BOM) to be associated with a process sequence (BOP), Such a linkage makes it possible to automatically generate test programs for specific processes/process steps based on customized training datasets, wherein the training datasets can be provided as described above. Knowledge of the hierarchical structure can be used here. In the case of printed circuit board assemblies, a hierarchical structure can be a division of the printed circuit board assembly into individual components and subassemblies (which can in turn be divided into individual components). The knowledge available in product development (product structure, bill of materials) can be utilized, thereby enabling training datasets corresponding to a specific process sequence to be generated automatically.

Such a test program can comprise a trained function, for example trained on the training datasets generated as described above, and can apply this trained function to captured images of real printed circuit board assemblies, for example at a particular manufacturing stage, in order to recognize individual components of these printed circuit board assemblies.

The function can be a classification and/or a localization function, in particular based on a convolutional neural network. The classification can be, for example, a good/bad assessment of a complete captured image.

Figure 13:
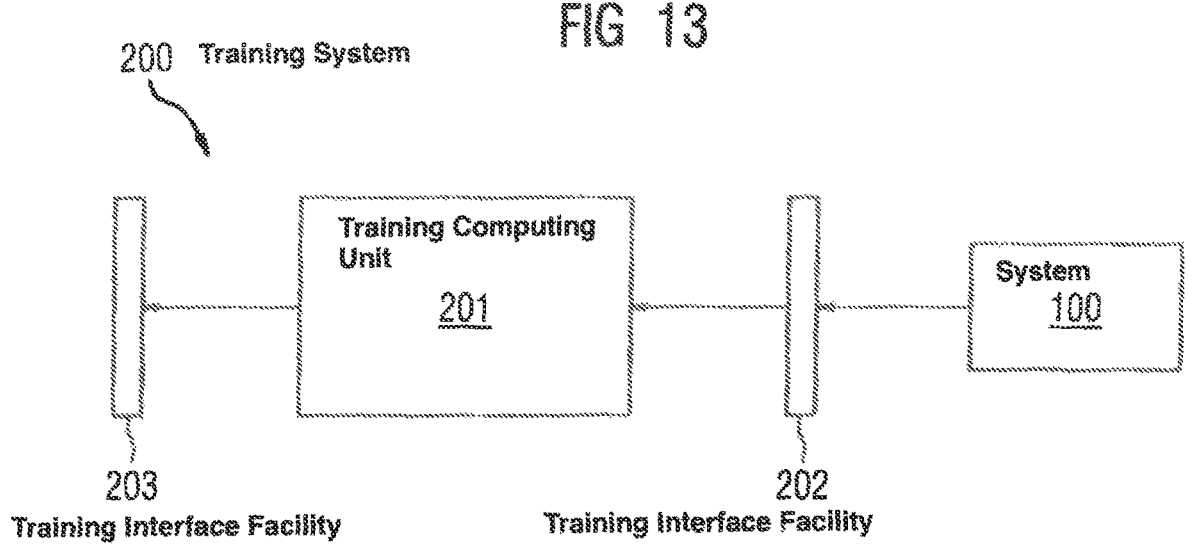
FIG. 13 shows a training system.

FIG. 13 shows an embodiment of a training system. The training system 200 shown comprises a first training interface facility 202 configured to receive training datasets provided for example by means of the aforementioned system 100. The training system 200 also comprises a training computing unit 201 configured to train a function based on the training dataset. For this purpose, the training computing unit 201 can comprise a training computer program containing the corresponding instructions. In addition, the training system 200 comprises a second training interface facility 203 configured to provide the trained function.

Particularly good results can be obtained for object recognition if the function is additionally trained on real labeled images. The number of real images in the training dataset can be small compared to the number of synthetic images or render images. For example, the percentage of real images in the training dataset can be 0.1 to 5%, in particular 1%.

Figure 14:
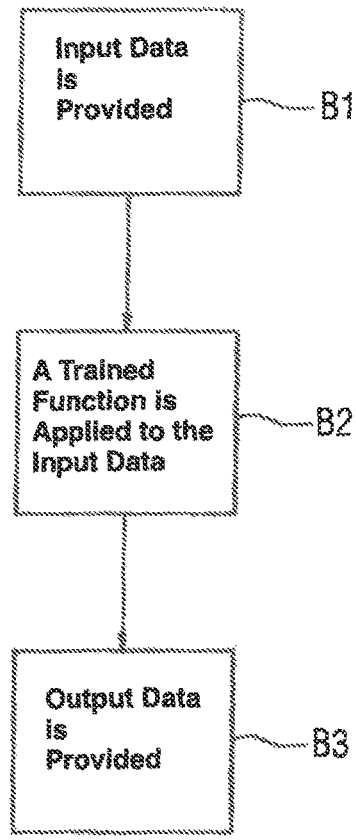
FIG. 14 shows a flowchart of a computer-implemented image recognition method.

FIG. 14 shows an embodiment of a computer-implemented image recognition method. The embodiment relates to an object recognition method which will be explained using the example of recognition of individual components of a printed circuit board assembly. It is understood that the image recognition method according to the invention is not limited to recognition of components in the printed circuit board assemblies.

First, input data is provided—step B1. This can be done, for example, by means of a first interface facility 302 (see also FIG. 16). The input data is a captured image 301 of a real object—in this case a printed circuit board assembly comprising a plurality of components.

In order to recognize the individual components of the printed circuit board assembly, a trained function, for example as described above, can be applied to the input data—step B2. This generates output data which is a segmentation of the input data and includes a classification of the input (for example the complete captured image) per se or of at least one component. This can be performed, for example, by a computing facility 303.

The output data is then provided, for example via a second interface facility 303—step B3.

The output data can be provided as a processed captured image 304, wherein the processed captured image 304 can be the captured image 301 with markings of the components contained therein, FIG. 15 shows an example of the processed captured image 304. FIG. 15 indicates that five different types of components have been detected on the captured image 301. Accordingly, five different types of markings 3040, 3041, 3042, 3043, 3044, 3045 can be seen on the processed captured image 304.

FIG. 15 also indicates that each of the real components recognized is marked. Each marking 3040, 3041, 3042, 3043, 3044, 3045 can contain a coordinate/position of the real component on the image 304 and preferably include a legend of the detected component. For example, the legend can include a designation E0, E1, E2, E3, E4, E5 of the component, which can correspond to the bill of materials (BOM) from the CAD model 1, and/or a confidence level (expressed in %) of the recognition of the corresponding component.

In addition, the markings 3040, 3041, 3042, 3043, 3044, 3045 can be visualized in the form of a rectangular border for example, Such visualization can allow the person involved to quickly verify the results.

Each marking 3040, 3041, 3042, 3043, 3044, 3045 can also have a predefinabie color. Markings 3040, 3041, 3042, 3043, 3044, 3045 of different types can have different colors.

It is understood that the steps of the aforementioned method can be repeated for a plurality of different captured images of real objects, for example printed circuit board assemblies.

FIG. 16 shows an embodiment of a data processing system suitable for carrying out, for example, the aforementioned image recognition method comprising steps B1 to B3. The data processing system 300 shown comprises the computing facility 303 designed and configured to receive captured images, for example the captured image 301, via the first interface facility 302, to process it for example as described above, and to provide/output it, for example in the form of the processed captured image 304, via the second interface facility 305.

The data processing system 300 can have image recognition software comprising instructions which (when executed by the image recognition software) cause, for example, the data processing system 300 to perform the aforementioned method steps B1 to B3, The image recognition software can be stored on the computing facility 303, for example.

FIG. 17 illustrates an embodiment of an industrial system. The methods and systems described above can be employed in the industrial system example shown. The industrial system is designed as an automation plant 1000.

The automation equipment can comprise a plurality of software and hardware components. The automation plant 1000 shown in FIG. 17 comprises two levels: a shop floor level 1100, for example a workshop, a factory floor, a production facility, or the like, and a data processing level implemented as a cloud level 1200. It is quite conceivable for the data processing level to be disposed at shop floor level (not shown) and to comprise for example one or more computing units.

The shop floor level 1100 can be set up to manufacture printed circuit board assemblies, for example.

The shop floor level 1100 can comprise, for example, the aforementioned system 100 having a corresponding computer program configured and/or designed to transfer the generated labeled datasets to a database 1201 disposed for example at the cloud level 1200.

The cloud level 1200 can comprise the aforementioned training system 200 configured, for example, to retrieve the labeled datasets from the database 1201, train a function based thereon, and provide that trained function. It is quite conceivable for the data processing level to be disposed at shop floor level and to contain the training system 200 (not shown).

For example, the trained function can be provided for retrieval from the data processing level, for example from the cloud, or can be transmitted to a test system 1101 for testing printed circuit board assemblies.

The test system 1101 may be disposed in the shop floor level 1100.

The test system 1101 comprises an image capture device 1102 and the aforementioned data processing system 300. The data processing system 300 can retrieve or receive the trained function, as described above, either from the cloud or from a local (powerful) training computer, for example from the training system 200.

The image capture device 1102 is designed to capture images of printed circuit board assemblies after a particular process step and transmit them to the data processing system 300, which then checks the state of the corresponding printed circuit board assembly and provides the result of the check for example in the form of an OK/NOK (ok or not ok) assessment.

The bill of material (BOM) can be used in the system 100 to import and name the components/parts. However, the system 100 does not necessarily contain information about the correct number and location of the components of a specific PCB assembly variant.

Although the invention has illustrated and described in detail by exemplary embodiments relating to printed circuit board assemblies and their manufacturing processes, the invention is not limited by the examples disclosed. Variations thereof will be apparent to persons skilled in the art without departing from the scope of protection sought for the invention as defined by the following claims. The invention is applicable mutatis mutandis in other fields in which image and, in particular, object recognition play an essential role. A non-exhaustive list of fields of application of the present invention includes: automotive production, aircraft construction, medical technology, packaging processes, order picking processes, inventory control, robotics, industrial plant engineering. The invention can thus be applied to all production areas where CAD data can be used and testing takes place. Therefore, the invention is not to be limited to individual applications. For example, applications in the autonomous driving of motor vehicles and of trains are quite conceivable if CAD models of corresponding environments and theft component parts are available.

What is claimed is:

1. A computer-implemented method for providing a labeled training dataset, the method comprising:
    selecting at least one electronic component in a CAD model of an electronic assembly, the electronic assembly comprising a plurality of electronic components, wherein the CAD model contains a description of the at least one electronic component and a coordinate of the at least one electronic component, wherein the description of the at least one electronic component includes information about a type of the at least one electronic component, and the coordinates of the electronic components are used to determine their positions in the electronic assembly;
    generating a plurality of different render images, wherein the different render images include the at least one selected electronic component, wherein a position of the at least one selected electronic component differs in a case of at least two different render images;
    labeling the different render images based on the description of the at least one electronic component contained in the CAD model and on the coordinate of the at least one electronic component contained in the CAD model; and
    providing a labeled training dataset based on the labeled render images, wherein a label of the at least one electronic component has a description of the at least one electronic component and a position of the at least one electronic component in the render image.

2. The method of claim 1, wherein the label is visualized in the form of a rectangular border, for example.

3. The method of claim 1, wherein the electronic assembly is in the form of a printed circuit board assembly, and wherein the electronic components are in the form of integrated or discrete components.

4. The method of claim 1, wherein the render images of the at least one selected electronic component differ from one another in at least one criterion, wherein the at least one criterion is selected from the group comprising: size of the at least one electronic component, illumination of the at least one electronic component, perspective of the at least one electronic component, background of the at least one electronic component, position of the at least one electronic component, surface, texture, and color.

5. The method of claim 1, wherein a number of electronic components are selected in the CAD model, wherein the selected electronic components can be associated with a process sequence.

6. A system for providing a labeled training dataset, the system comprising:

a computer-readable memory containing a CAD model of an electronic assembly, the electronic assembly comprising a plurality of electronic components, wherein the CAD model includes a description of at least one electronic component and a coordinate of the at least one electronic component, wherein the description of the at least one electronic component includes information about a type of the at least one electronic component and the coordinates of the electronic components are used to determine their positions in the electronic assembly;

a first interface configured and designed to enable at least one electronic component to be selected in the CAD model;

a computing unit configured to generate a plurality of different render images, wherein the different render images include the at least one selected electronic component, wherein a position of the at least one selected electronic component differs in a case of at least two different render images, and to label the different render images based on the description of the at least one electronic component contained in the CAD model and on the coordinate of the at least one electronic component contained in the CAD model, wherein a label of the at least one electronic component contains a description of the at least one electronic component and a position of the at least one electronic component in a render image; and a second interface designed and configured to provide a training dataset based on the different labeled render images.

7. A computer-implemented method for providing a trained function, the method comprising:

providing at least one labeled training dataset according to a method of claim 1;

training a function based on the at least one labeled training dataset in order to produce a trained function; and providing the trained function.

8. The method of claim 7, wherein the function is a classification function and/or a localization function, in particular based on a convolutional neural network.

9. A computer-implemented image recognition method, the method comprising:

providing input data, wherein the input data is a captured image of a real electronic assembly, wherein the real electronic assembly comprises a plurality of real electronic components;

applying a trained function to the input data to generate output data, wherein the trained function is provided according to a method of claim 7, wherein the output data comprises a classification and/or a localization of at least one real electronic component in the input data; and providing the output data.

10. The method of claim 9, further comprising repeating the steps of the method for a plurality of different captured images.

11. The method of claim 9, further comprising providing the output data in the form of a processed captured image, wherein the processed captured image is the captured image with at least one marking of the at least one real electronic component.

12. The method of claim 11, wherein the marking includes a coordinate of the at least one electronic component and/or a label of the at least one real electronic component, and is preferably visualized in the form of a rectangular border for example, in particular in a predefinable color.

13. The method of claim 9, wherein the electronic assembly is in the form of a printed circuit board assembly, and the electronic components are hi the form of integrated or discrete components.

14. A system comprising an image capture device and a data processing system, wherein the data processing system is designed and configured to carry out a method of claim 9.

15. A computer program embodied on a non-transitory computer readable medium, the program comprising:

first instructions that cause a system to select at least one electronic component in a CAD model of an electronic assembly, the electronic assembly comprising a plurality of electronic components, wherein the CAD model contains a description of the at least one electronic component and a coordinate of the at least one electronic component, wherein the description of the at least one electronic component includes information about a type of the at least one electronic component, and the coordinates of the electronic components are used to determine their positions in the electronic assembly;

generate a plurality of different render images, wherein the different render images include the at least one selected electronic component, wherein a position of the at least one selected electronic component differs in a case of at least two different render images;

label the different render images based on the description of the at least one electronic component contained in the CAD model and on the coordinate of the at least one electronic component contained in the CAD model; and provide a labeled training dataset based on the labeled render images, wherein a label of the at least one electronic component has a description of the at least one electronic component and a position of the at least one electronic component in the render image;

and/or second instructions which, when the program is executed by a computer, cause the computer to select at least one electronic component in a CAD model of an electronic assembly, the electronic assembly comprising a plurality of electronic components, wherein the CAD model contains a description of the at least one electronic component and a coordinate of the at least one electronic component, wherein the description of the at least one electronic component includes information about a type of the at least one electronic component, and the coordinates of the electronic components are used to determine their positions in the electronic assembly;

generate a plurality of different render images, wherein the different render images include the at least one selected electronic component, wherein a position of the at least one selected electronic component differs in a case of at least two different render images;

label the different render images based on the description of the at least one electronic component contained in the CAD model and on the coordinate of the at least one electronic component contained in the CAD model;

provide a labeled training dataset based on the labeled render images, wherein a label of the at least one electronic component has a description of the at least one electronic component and a position of the at least one electronic component in the render image;

train a function based on the at least one labeled training dataset in order to produce a trained function; and providing the trained function;

and/or third instructions that cause a system to select at least one electronic component in a CAD model of an electronic assembly, the electronic assembly comprising a plurality of electronic components, wherein the CAD model contains a description of the at least one electronic component and a coordinate of the at least one electronic component, wherein the description of the at least one electronic component includes information about a type of the at least one electronic component, and the coordinates of the electronic components are used to determine their positions in the electronic assembly;

generate a plurality of different render images, wherein the different render images include the at least one selected electronic component, wherein a position of the at least one selected electronic component differs in a case of at least two different render images;

label the different render images based on the description of the at least one electronic component contained in the CAD model and on the coordinate of the at least one electronic component contained in the CAD model;

provide a labeled training dataset based on the labeled render images, wherein a label of the at least one electronic component has a description of the at least one electronic component and a position of the at least one electronic component in the render image;

train a function based on the at least one labeled training dataset in order to produce a trained function;

providing the trained function;

provide input data, wherein the input data is a captured image of a real electronic assembly, wherein the real electronic assembly comprises a plurality of real electronic components;

apply the trained function to the input data to generate output data, wherein the output data comprises a classification and/or a localization of at least one real electronic component in the input data; and provide the output data.

* * * * *